(12) United States Patent
Chen

(10) Patent No.: US 10,951,732 B2
(45) Date of Patent: Mar. 16, 2021

(54) SERVICE PROCESSING METHOD AND DEVICE

(71) Applicant: Huawei Technologies Co., Ltd., Shenzhen (CN)

(72) Inventor: Zhifeng Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 15/935,788

(22) Filed: Mar. 26, 2018

(65) Prior Publication Data

US 2018/0219971 A1 Aug. 2, 2018

Related U.S. Application Data

(63) Continuation of application No. PCT/CN2016/084750, filed on Jun. 3, 2016.

(30) Foreign Application Priority Data

Sep. 25, 2015 (CN) .......................... 201510621776.X

(51) Int. Cl.
*H04L 29/08* (2006.01)
*H04L 29/06* (2006.01)

(52) U.S. Cl.
CPC .............. *H04L 67/32* (2013.01); *H04L 65/40* (2013.01); *H04L 67/10* (2013.01); *H04L 67/325* (2013.01)

(58) Field of Classification Search
CPC ....... H04L 67/32; H04L 67/325; H04L 65/40; H04L 67/10
See application file for complete search history.

(56) References Cited

U.S. PATENT DOCUMENTS 8,761,085 B2 * 6/2014 Mizukoshi .............. H04W 8/06
370/328
9,667,416 B1 * 5/2017 Machani ............... H04L 9/0822
(Continued)

FOREIGN PATENT DOCUMENTS

CN 1859263 A 11/2006
CN 101589594 A 11/2009
(Continued)

OTHER PUBLICATIONS

Machine Translation and Abstract of Chinese Publication No. CN104883695, Sep. 2, 2015, 7 pages.
(Continued)

*Primary Examiner* — Joe Chacko
(74) *Attorney, Agent, or Firm* — Conley Rose, P.C.

(57) ABSTRACT

A service processing method is applied to a system including a first distributed node and at least two second distributed nodes to ensure correct service processing. The first distributed node communicates with a controller using the second distributed nodes. The service processing method performed by the first distributed node, includes obtaining a first operation request, where the first operation request includes a first service object, allocating a first identification code to the first operation request according to a preset rule, where the first identification code identifies a processing sequence of the first operation request for the first service object, and sending the first operation request and the first identification code to the controller using a second distributed node such that the controller determines, according to the preset rule and the first identification code, whether the first operation request needs to be processed.

20 Claims, 7 Drawing Sheets

(56) References Cited

U.S. PATENT DOCUMENTS

| | | | | |
|---|---|---|---|---|
| 2003/0005167 | A1* | 1/2003 | Khare | G06F 9/52 |
| | | | | 719/310 |
| 2006/0195606 | A1* | 8/2006 | Wardwell | H04L 12/66 |
| | | | | 709/236 |
| 2007/0140229 | A1 | 6/2007 | Tang | |
| 2008/0182576 | A1* | 7/2008 | Tsirtsis | H04W 8/02 |
| | | | | 455/435.1 |
| 2008/0298303 | A1 | 12/2008 | Tsirtsis | |
| 2011/0307628 | A1* | 12/2011 | Chiba | H04L 49/355 |
| | | | | 709/241 |
| 2011/0317701 | A1* | 12/2011 | Yamato | H04L 45/04 |
| | | | | 370/392 |
| 2014/0177634 | A1 | 6/2014 | Jiang et al. | |
| 2015/0046574 | A1* | 2/2015 | Celi, Jr. | H04L 41/5006 |
| | | | | 709/223 |

FOREIGN PATENT DOCUMENTS

| | | |
|---|---|---|
| CN | 101589602 A | 11/2009 |
| CN | 104883695 A | 9/2015 |

OTHER PUBLICATIONS

"OpenFlow Switch Specification," ONF TS-002, Version 1.1.0 Implemented ( Wire Protocol 0x02 ), Feb. 28, 2011, 58 pages.
"OpenFlow Switch Specification," ONF TS-012, Version 1.4.0 (Wire Protocol 0x05), Oct. 14, 2013, 206 pages.
Foreign Communication From a Counterpart Application, PCT Application No. PCT/CN2016/084750, English Translation of International Search Report dated Jul. 26, 2016, 2 pages.
Foreign Communication From a Counterpart Application, PCT Application No. PCT/CN2016/084750, English Translation of Written Opinion dated Jul. 26, 2016, 6 pages.
Kearns, P., et al., "Immediate Ordered Service in Distributed Systems," XP010016589, 9th International Conference on Distributed Computing Systems, Sessions 3B: Distributed Operating Systems Consistency, Jun. 5, 1989, pp. 611-618.
Foreign Communication From a Counterpart Application, European Application No. 16847841.0, Extended European Search Report dated Jul. 30, 2018, 15 pages.

* cited by examiner

SERVICE PROCESSING METHOD AND DEVICE

CROSS-REFERENCE TO RELATED APPLICATIONS

This application is a continuation of International Patent Application No. PCT/CN2016/084750 filed on Jun. 3, 2016, which claims priority to Chinese Patent Application No. 201510621776.X filed on Sep. 25, 2015. The disclosures of the aforementioned applications are hereby incorporated by reference in their entireties.

TECHNICAL FIELD

Embodiments of the present disclosure relate to the field of communications technologies, and in particular, to a service processing method and a device.

BACKGROUND

A software defined network (SDN) is a system architecture for optimizing and simplifying network operations. After an SDN technology is introduced into the cloud computing field, an SDN controller accesses a distributed cloud platform towards the north such that a more intelligent service function can be implemented. After the SDN is introduced into the cloud computing field, a system architecture may be shown in FIG. 1. An administrator manages devices and resources on the distributed cloud platform using a cloud platform interface provided by the distributed platform. The distributed cloud platform includes multiple distributed nodes. The distributed nodes are classified into two types, a node that provides a northbound interface capability, for example, a distributed node 1, and a node that provides a service processing capability and a southbound interface capability, for example, a distributed node 2, 3, or 4. The distributed cloud platform is interconnected to the SDN controller towards the south, and controls a large amount of network data using the SDN controller. Therefore, the distributed cloud platform is aware of a super network device instead of numerous network devices.

In the current system architecture, because the cloud platform interface is unaware of presence of the distributed cloud platform, each cloud platform interface instance accesses the cloud platform using one distributed node. Certainly, it is totally feasible that different cloud platform interface instances access the cloud platform using different distributed nodes. The cloud platform interface shown in FIG. 1 accesses the cloud platform using the distributed node 1. Therefore, all operation requests delivered using the cloud platform interface first pass through the distributed node 1, and then are forwarded by other distributed nodes (for example, distributed nodes 2, 3, and 4) to the SDN controller for processing.

In the foregoing network architecture, when two operation requests having a mutual update relationship are sent in sequence for a same service object, because the distributed node 1 sends the two operation requests in sequence to the controller using different distributed nodes (for example, distributed nodes 2 and 3), to ensure a correct processing result, it needs to be ensured that a first sent operation request arrives at the controller first such that a subsequently sent operation request is finally effective. However, on the distributed cloud platform, because nodes on the platform have distributed features and different nodes have different processing capabilities, generally, it cannot be ensured that the first sent operation request arrives at the controller first. If the subsequently sent operation request arrives at the controller before the first sent operation request, the first sent operation request is finally processed, and in this case, the first sent operation request is finally effective. Consequently, a processing result is incorrect.

SUMMARY

In view of this, embodiments of the present disclosure provide a service processing method and a device to ensure correct service processing on a distributed cloud platform.

According to a first aspect, a service processing method is provided and applied to a system including a first distributed node and at least two second distributed nodes, where the first distributed node communicates with a controller using the at least two second distributed nodes, and the method includes obtaining, by the first distributed node, a first operation request, where the first operation request includes a first service object, allocating, by the first distributed node, a first identification code to the first operation request according to a preset rule, where the first identification code is used to identify a processing sequence of the first operation request for the first service object, and sending, by the first distributed node, the first operation request and the first identification code to the controller using a second distributed node in the at least two second distributed nodes such that the controller determines, according to the preset rule and the first identification code, whether the first operation request needs to be processed.

With reference to the first aspect, in a first implementation of the first aspect, that the controller determines, according to the preset rule and the first identification code, whether the first operation request needs to be processed includes the first operation request needs to be processed if it is determined, according to the preset rule and the first identification code, that the first operation request is sent after a second operation request processed by the controller, or the first operation request is not need to be processed if it is determined, according to the preset rule and the first identification code, that the first operation request is sent before a second operation request processed by the controller, where the second operation request is sent by the first distributed node to the controller using another second distributed node in the at least two second distributed nodes, and the second operation request includes the first service object.

With reference to the first implementation of the first aspect, in a second implementation of the first aspect, the first identification code is a timestamp, or identification codes are ascending or descending natural numbers, and the preset rule includes for different operation requests including a same service object, corresponding identification codes are allocated according to a sequence of the operation requests.

With reference to the first aspect, or the first or the second implementation of the first aspect, in a third implementation of the first aspect, the method further includes obtaining, by the first distributed node, a third operation request, where the third operation request includes a second service object, allocating, by the first distributed node, a third identification code to the third operation request according to the preset rule, where the third identification code is used to identify a processing sequence of the third operation request for the second service object, setting, by the first distributed node, the first identification code as a dependent code of the third operation request if the first distributed node determines that the third operation request is dependent upon the first operation request, and sending, by the first distributed node, the third operation request, the third identification code, and the dependent code of the third operation request to the controller using another second distributed node in the at least two second distributed nodes such that the controller processes the third operation request according to the dependent code of the third operation request after processing the first operation request.

According to a second aspect, a service processing method is provided and applied to a system including a first distributed node and at least two second distributed nodes, where the first distributed node communicates with a controller using the at least two second distributed nodes, and the method includes receiving, by the controller, a first operation request and a first identification code that are sent by the first distributed node using a second distributed node in the at least two second distributed nodes, where the first operation request includes a first service object, and the first identification code is used to identify a processing sequence of the first operation request for the first service object, and determining, by the controller according to a preset rule and the first identification code, whether the first operation request needs to be processed, and processing the first operation request if it is determined, according to the preset rule and the first identification code, that the first operation request is sent after a second operation request processed by the controller, or skip processing the first operation request, if it is determined, according to the preset rule and the first identification code, that the first operation request is sent before a second operation request processed by the controller, where the second operation request is sent by the first distributed node to the controller using another second distributed node in the at least two second distributed nodes, and the second operation request includes the first service object.

With reference to the second aspect, in a first implementation of the second aspect, the method further includes receiving, by the controller, a third operation request, a third identification code, and a dependent code of the third operation request that are sent by the first distributed node using another second distributed node in the at least two second distributed nodes, where the third operation request includes a second service object, the third identification code is used to identify a processing sequence of the third operation request for the second service object, and the first identification code is the dependent code of the third operation request, and processing, by the controller, the third operation request according to the dependent code of the third operation request after processing the first operation request.

According to a third aspect, a first distributed node is provided, where the first distributed node communicates with a controller using at least two second distributed nodes, and the first distributed node includes an obtaining unit configured to obtain a first operation request, where the first operation request includes a first service object, an allocation unit configured to allocate a first identification code to the first operation request according to a preset rule, where the first identification code is used to identify a processing sequence of the first operation request for the first service object, and a sending unit configured to send the first operation request and the first identification code to the controller using a second distributed node in the at least two second distributed nodes such that the controller determines, according to the preset rule and the first identification code, whether the first operation request needs to be processed.

With reference to the third aspect, in a first implementation of the third aspect, that the controller determines, according to the preset rule and the first identification code, whether the first operation request needs to be processed includes that the controller processes the first operation request if it is determined, according to the preset rule and the first identification code, that the first operation request is sent after a second operation request processed by the controller, or the controller does not process the first operation request if it is determined, according to the preset rule and the first identification code, that the first operation request is sent before a second operation request processed by the controller, where the second operation request is sent by the first distributed node to the controller using another second distributed node in the at least two second distributed nodes, and the second operation request includes the first service object.

With reference to the third aspect or the first implementation of the third aspect, in a second implementation of the third aspect, the obtaining unit is further configured to obtain a third operation request, where the third operation request includes a second service object, the allocation unit is further configured to allocate a third identification code to the third operation request according to the preset rule, where the third identification code is used to identify a processing sequence of the third operation request for the second service object, the first distributed node further includes a determining unit configured to determine that the third operation request is dependent upon the first operation request, and use the first identification code as a dependent code of the third operation request, and the sending unit is further configured to send the third operation request, the third identification code, and the dependent code of the third operation request to the controller using another second distributed node in the at least two second distributed nodes such that the controller processes the third operation request according to the dependent code of the third operation request after processing the first operation request.

According to a fourth aspect, a controller is provided and includes a receiving unit configured to receive a first operation request and a first identification code that are sent by a first distributed node using a second distributed node in at least two second distributed nodes, where the first operation request includes a first service object, and the first identification code is used to identify a processing sequence of the first operation request for the first service object, and a determining unit configured to determine, according to a preset rule and the first identification code, whether the first operation request needs to be processed, and process the first operation request if it is determined, according to the preset rule and the first identification code, that the first operation request is sent after a second operation request processed by the controller, or skip processing the first operation request if it is determined, according to the preset rule and the first identification code, that the first operation request is sent before a second operation request processed by the controller, where the second operation request is sent by the first distributed node to the controller using another second distributed node in the at least two second distributed nodes, and the second operation request includes the first service object.

With reference to the fourth aspect, in a first implementation of the fourth aspect, the receiving unit is further configured to receive a third operation request, a third identification code, and a dependent code of the third operation request that are sent by the first distributed node using another second distributed node in the at least two second distributed nodes, where the third operation request includes a second service object, the third identification code is used to identify a processing sequence of the third operation request for the second service object, and the first identification code is the dependent code of the third operation request, and the controller further includes a processing unit, and the processing unit is configured to process the third operation request according to the dependent code of the third operation request after processing the first operation request.

The technical solutions of this application have the following advantages.

The first distributed node allocates an identification code to an operation request to identify a processing sequence of different operation requests including a same service object for the service object, and correspondingly sends the operation request and the identification code of the operation request to the controller such that the controller determines, according to the preset rule and the identification code of the operation request, whether the operation request needs to be processed. In this way, it is ensured that an operation request that is last sent by the first distributed node and that includes the service object is finally effective. Therefore, a service processing error caused by distributed features of nodes is avoided, and correct service processing is ensured.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Because nodes on a distributed cloud platform have distributed features and different nodes have different processing capabilities, it cannot be ensured that a first sent service arrives first. Therefore, correct service processing cannot be ensured, either. The embodiments of the present disclosure provide a service processing method and a related device to ensure correct service processing on the distributed cloud platform.

Figure 1:
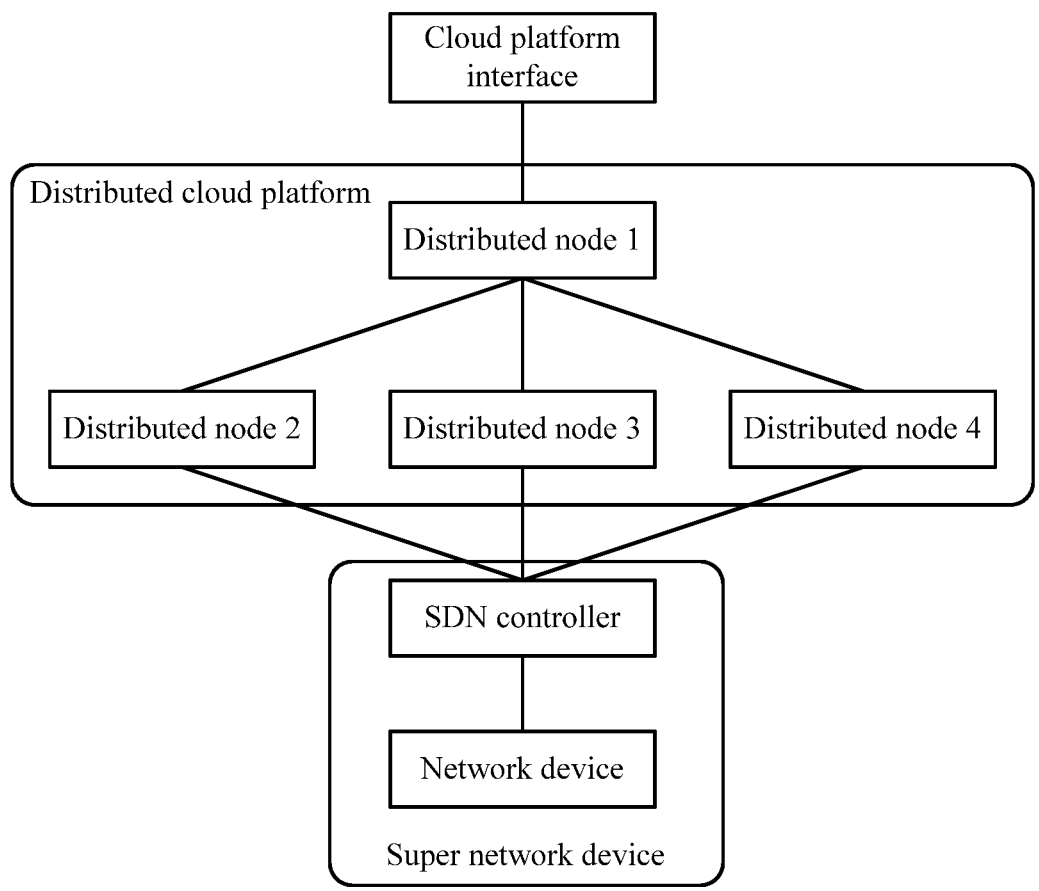
FIG. 1 is a schematic diagram of a system architecture of a distributed cloud platform.

In the embodiments of the present disclosure, a system includes two types of distributed nodes. A distributed node providing a northbound interface capability, for example, a distributed node 1 in FIG. 1 may be referred to as a first distributed node. A distributed node providing a service processing capability and a southbound interface capability, for example, a distributed node 2, 3, or 4 in FIG. 1 is referred to as a second distributed node. There are at least two second distributed nodes. The first distributed node communicates with a controller using the at least two second distributed nodes.

Figure 2:
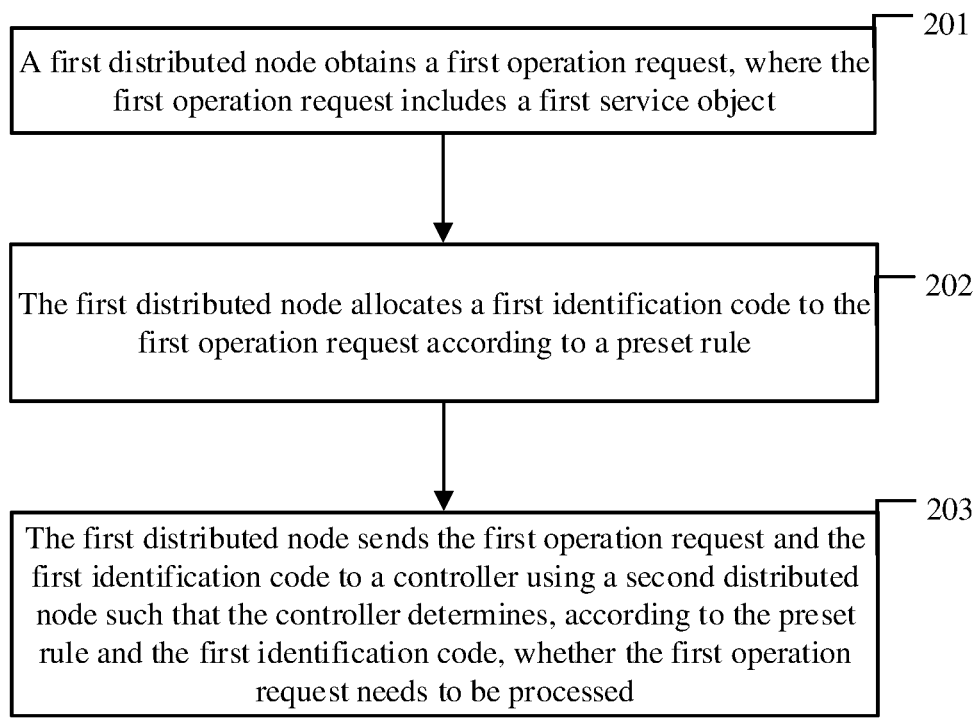
FIG. 2 is a flowchart of a service processing method according to an embodiment of the present disclosure.

Referring to FIG. 2, FIG. 2 is a flowchart of a service processing method according to an embodiment of the present disclosure. The method includes the following steps.

Step 201: A first distributed node obtains a first operation request, where the first operation request includes a first service object.

A cloud platform interface may deliver the first operation request to the first distributed node according to an operation of a user.

Step 202: The first distributed node allocates a first identification code to the first operation request according to a preset rule.

The first identification code is used to identify a processing sequence of the first operation request for the first service object. For different operation requests including a same service object, a processing sequence of a first sent operation request for the service object should be higher than a processing sequence of a subsequently sent operation request for the service object.

Step 203: The first distributed node sends the first operation request and the first identification code to the controller using a second distributed node in the at least two second distributed nodes such that the controller determines, according to the preset rule and the first identification code, whether the first operation request needs to be processed.

In a specific implementation, that the controller determines, according to the preset rule and the first identification code, whether the first operation request needs to be processed includes that the first operation request is processed if it is determined, according to the preset rule and the first identification code, that the first operation request is sent after a second operation request processed by the controller (that is, the second operation request is sent before the first operation request, a processing sequence of the second operation request for the first service object should be higher than the processing sequence of the first operation request for the first service object, and an actual processing sequence is consistent with this), or the first operation request is not processed if it is determined, according to the preset rule and the first identification code, that the first operation request is sent before a second operation request processed by the controller (that is, the first operation request is sent before the second operation request, and the processing sequence of the first operation request for the first service object should be higher than a processing sequence of the second operation request for the first service object, but an actual processing sequence is opposite to this, and the second operation request is first processed). The second operation request is sent by the first distributed node to the controller using another second distributed node in the at least two second distributed nodes, and the second operation request includes the first service object.

Operation requests including a same service object have different identification codes. Optionally, the identification code may be a timestamp, and the first distributed node may use, as an identification code of the operation request, a timestamp existing when the operation request is sent. The preset rule may be a time sequence. For example, if the first distributed node sends the first operation request including the first service object to the controller before sending the second operation request including the first service object to the controller, the first identification code of the first operation request is a timestamp earlier than a second identification code of the second operation request. If the controller first receives the second operation request, and receives the first operation request after processing the second operation request, the controller determines, according to the preset rule and the first identification code, that the first distributed node sends the first operation request before sending the second operation request. In this case, the first operation request is not processed.

Optionally, the identification code may be ascending or descending natural numbers. The first distributed node may allocate ascending or descending natural numbers to operation requests as identification codes according to a sequence of the operation requests. The preset rule may be ascending order or descending order. For example, the identification codes are ascending natural numbers. For example, if the first distributed node sends the first operation request including the first service object to the controller before sending the second operation request including the first service object to the controller, the first identification code allocated to the first operation request is a natural number less than the second identification code of the second operation request. If the controller first receives the second operation request, and receives the first operation request after processing the second operation request, the controller may determine, according to the preset rule and the first identification code, that the first distributed node sends the first operation request before sending the second operation request. In this case, the first operation request is not processed.

Figure 3:
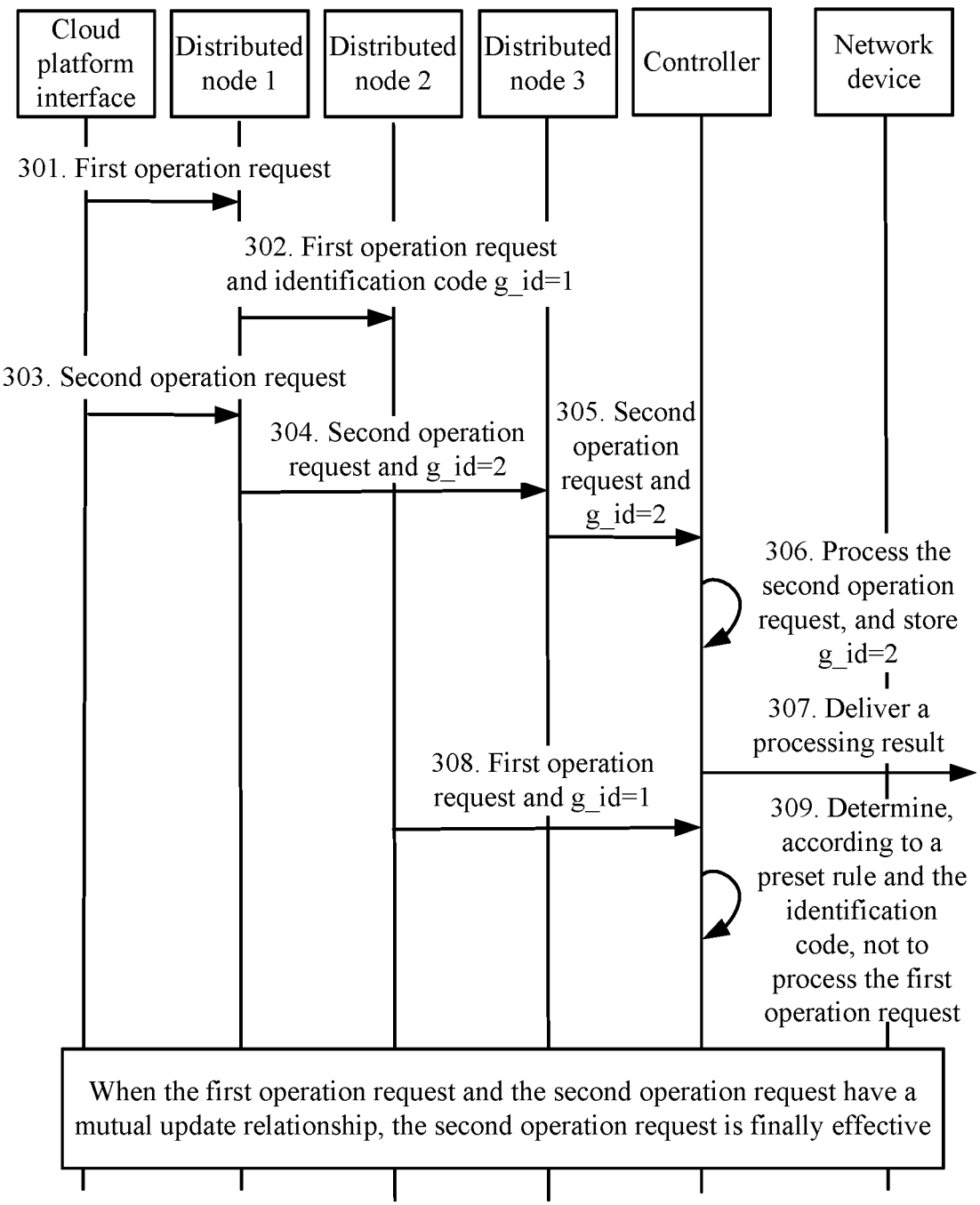
FIG. 3 is a schematic interaction diagram of a service processing method according to an embodiment of the present disclosure.

For ease of understanding, the following uses a specific embodiment to describe a service processing method provided in the present disclosure. Referring to FIG. 3, FIG. 3 is a schematic interaction diagram of a service processing method according to an embodiment of the present disclosure. The method includes the following steps.

Step 301: A cloud platform interface sends a first operation request to a distributed node 1, where the first operation request includes a first service object.

Step 302: The distributed node 1 allocates a first identification code to the first operation request, and sends the first identification code and the first operation request to a distributed node 2.

The distributed node 1 may allocate the first identification code to the first operation request according to a preset rule. In this embodiment, an example in which identification codes are ascending natural numbers and the preset rule is a time sequence is used for description. For example, the first identification code g_id allocated to the first operation request herein is 1.

After receiving the first operation request, the distributed node 1 may select a second distributed node using a distributed algorithm, select a second distributed node according to a current load status of each second distributed node, or select a second distributed node randomly, and send the first operation request and the identification code 1 of the first operation request to the selected second distributed node. For example, the second distributed node selected this time is the distributed node 2. For a reason of a network or the distributed node 2, the first operation request and the identification code of the first operation request are not forwarded by the distributed node 2 in a timely manner.

Step 303: The cloud platform interface sends a second operation request to the distributed node 1, where the second operation request includes the first service object.

That is, the cloud platform interface sends two operation requests including a same service object (i.e., the first service object) to the distributed node 1 in sequence.

Step 304: The distributed node 1 allocates a second identification code to the second operation request, and sends the second identification code and the second operation request to a distributed node 3.

That is, the distributed node 1 forwards different operation requests including a same service object to a controller using different second distributed nodes. For example, the second identification code g_id allocated to the second operation request herein is 2.

Step 305: The distributed node 3 forwards the second operation request and the second identification code to a controller.

That is, after receiving the second operation request and the second identification code, the distributed node 3 performs processing in a timely manner, and forwards the second operation request and the second identification code to the controller in a timely manner.

Step 306: The controller processes the second operation request, and after the processing, stores the identification code 2 of the second operation request.

Further, the controller may maintain the following Table 1 in a local cache. The table is used to record information about processed operation requests.

TABLE 1

| Included service object | Operation request and identification code g_id of the operation request |
|---|---|
| First service object | First operation request and g_id = 1 |
| | Second operation request and g_id = 2 |
| Second service object | Third operation request and g_id = 3 |
| | Fourth operation request and g_id = 4 |
| Third service object | Fifth operation request and g_id = 5 |

"Processed" in this embodiment means "successfully processed." Information about an operation request that is not processed or is not successfully processed is not recorded in the table.

Further, in this embodiment, when the controller receives the second operation request (including the first service object) and the identification code 2, because the controller has not stored an identification code of another operation request including a same service object as the second operation request, that is, the controller previously has not processed or has not successfully processed another operation request including a same service object as the second operation request, the controller may directly process the second operation request.

Step 307: The controller delivers a processing result to a corresponding network device.

In this case, the second operation request takes effect.

Step 308: The distributed node 2 forwards the first operation request and the first identification code to the controller.

Step 309: The controller determines, according to a preset rule and the first identification code, not to process the first operation request.

The preset rule is the time sequence, the identification code of the first operation request is 1, and the identification code that is of the processed another operation request including the same service object (the first service object) and is stored in the controller is 2. This indicates that the distributed node 1 sends the first operation request before sending the second operation request. The first operation request should be processed before the second operation request, but actually, the second operation request is processed before the first operation request. Therefore, the first operation request does not need to be processed.

In this embodiment, the controller may directly determine whether an identification code of a current operation request is greater than an identification code that is of another operation request including a same service object as the current operation request and is stored in the controller. If yes, the controller determines that the current operation request needs to be processed. Otherwise, the controller determines that the current operation request does not need to be processed.

The following uses an example for description. Likewise, an Internet Protocol (IP) address update is used as an example. For example, the cloud platform interface sends two IP address update requests to a same network entity in sequence according to an operation of a user. According to the service processing method provided in the present disclosure, regardless of whether a first sent operation request or a subsequently sent operation request arrives at the controller first, the subsequently sent operation request is finally effective. That is, if the first sent operation request arrives first, the controller may process the operation requests in sequence according to identification codes of the operation requests, and the subsequently sent operation request is finally effective. If the first sent operation request arrives later, the processor may determine, according to an identification code of the operation request, not to process the operation request that does not comply with a preset processing sequence. In this way, it is ensured that the subsequently sent operation request is still finally effective.

In this embodiment, when sending different operation requests for a same service object to the controller using different second distributed nodes, the first distributed node allocates different identification codes to the different operation requests, where the identification codes are used to identify a processing sequence of the operation requests for the service object, and sends the operation requests and the identification codes of the operation requests to the controller such that the controller determines, according to an identification code of an operation request, whether the current operation request needs to be processed. In this way, it is ensured that an operation request that is last sent by the first distributed node and that includes the service object is finally effective. Therefore, a service processing error caused by distributed features of nodes is avoided, and correct service processing is ensured.

Figure 4:
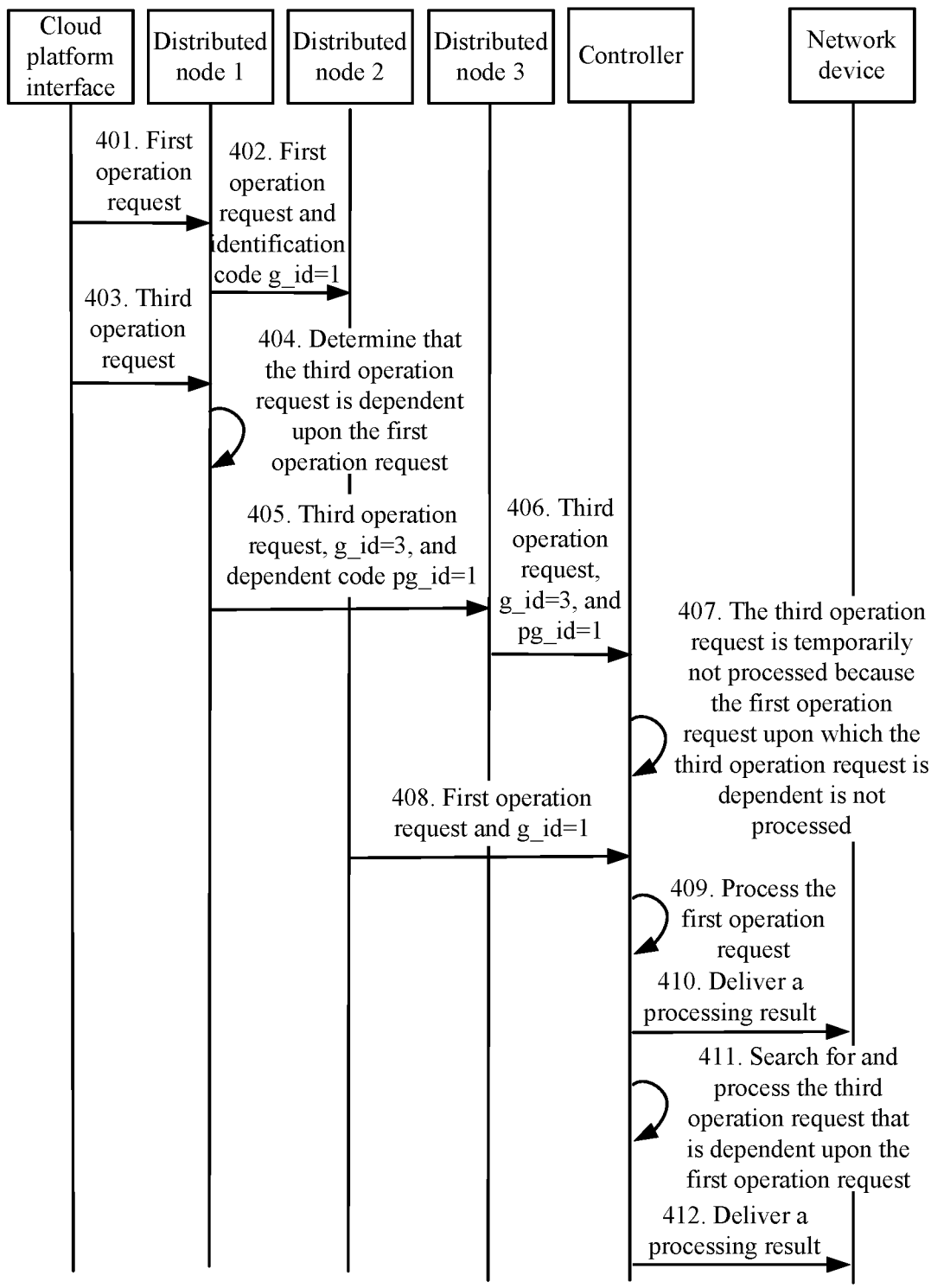
FIG. 4 is a schematic interaction diagram of another service processing method according to an embodiment of the present disclosure.

The foregoing embodiment resolves a problem of a processing error caused when two operation requests having a mutual update relationship are sent in sequence for a same service object and processing is out of order. In an actual application, the following application scenario may also occur. Two operation requests are sent in sequence for different service objects, and whether a latter operation request can be processed is dependent upon a processing status of a former operation request. The latter operation request can be processed only when the former operation request is successfully processed. If the former operation request is not successfully processed (is not processed or fails to be processed), the latter operation request directly fails to be processed. In other approaches, for the application scenario in which the latter operation request is dependent upon the processing status of the former operation request, there is no effective mechanism for ensuring sequential processing of the sequential operation requests. Therefore, a processing failure is prone to occur because the latter operation request is directly processed before the former operation request is processed. For this application scenario, the present disclosure further provides a solution. Referring to FIG. 4, FIG. 4 is a schematic interaction diagram of another service processing method according to an embodiment of the present disclosure. The method includes the following steps.

Step 401: A cloud platform interface sends a first operation request to a distributed node 1, where the first operation request includes a first service object.

Step 402: The distributed node 1 allocates a first identification code g_id=1 to the first operation request, and sends g_id=1 and the first operation request to a distributed node 2.

For a reason of a network or the distributed node 2, the first operation request and g_id=1 are not forwarded by the distributed node 2 in a timely manner.

Step 403: The cloud platform interface sends a third operation request to the distributed node 1, where the third operation request includes a second service object.

Step 404: The distributed node 1 determines that the third operation request is dependent upon the first operation request, and sets the first identification code as a dependent code of the third operation request.

In a specific implementation, the distributed node 1 may determine a dependency between operation requests according to service logic. For example, if the first operation request is an operation request for creating a router R1, and the third operation request is an operation request for creating an interface A on the router R1, it may be determined, according to service logic, that the third operation request is dependent upon the first operation request.

Step 405: The distributed node 1 allocates a third identification code g_id=3 to the third operation request, and sends the third operation request, g_id=3, and the dependent code pg_id=1 to a distributed node 3.

Step 406: The distributed node 3 forwards the third operation request, g_id=3, and pg_id=1 to a controller.

That means, after receiving the third operation request, g_id=3, and pg_id=1, the distributed node 3 performs processing in a timely manner, and forwards the third operation request, g_id=3, and pg_id=1 to the controller in a timely manner.

Step 407: The controller determines that the first operation request upon which the third operation request is dependent and whose identification code is 1 is not processed, and temporarily does not process the third operation request.

Further, the controller may maintain the following Table 2 in a local cache. The table is used to record a processing status of each operation request.

TABLE 2

| Included service object | Operation request and identification code g_id of the operation request |
|---|---|
| | g_id = 1 (unprocessed) |
| Second service object | Third operation request, g_id = 3 (to-be-processed), and pg_id = 1 |
| Third service object | Fourth operation request, g_id = 4 (to-be-processed), and pg_id = 1 |

After receiving the third operation request, g_id=3, and pg_id=1, the controller may determine a status of the identification code 1 of the first operation request upon which the third operation request is dependent. Since the controller has not received the first operation request and the identification code 1 of the first operation request that are forwarded by the distributed node 2, the controller has not stored the identification code 1 and the status of the identification code 1. Therefore, after receiving the third operation request, g_id=3, and pg_id=1, the controller may mark the identification code 1 with an unprocessed state. Certainly, if the controller receives, before receiving the third operation request, g_id=3, and pg_id=1, the first operation request and the identification code 1 of the first operation request that are forwarded by the distributed node 2, but a processing result of the first operation request is a processing failure, the controller does not store the identification code 1 and the status of the identification code 1, either. In this case, when receiving the third operation request, g_id=3, and pg_id=1, the controller may still mark the identification code 1 with an unprocessed state. Therefore, in this embodiment, the unprocessed state may indicate "unprocessed," and may also indicate a processing failure. Because the identification code 1 is in the unprocessed state, the controller temporarily does not process the third operation request, but stores the third operation request, the identification code 3, and the dependent code of the third operation request, and sets the identification code 3 of the third operation request to a to-be-processed state.

Step 408: The distributed node 2 forwards the first operation request and the identification code g_id=1 of the first operation request to the controller.

Step 409: The controller processes the first operation request.

After the first operation request is successfully processed, the controller sets the identification code of the first operation request to a processed state.

Step 410: The controller delivers a processing result to a network device.

Step 411: The controller searches for and processes the third operation request that is dependent upon the first operation request.

After successfully processing the first operation request, the controller searches for the third operation request that is dependent upon the first operation request and whose identification code is in the to-be-processed state, processes the third operation request, and after successful processing, marks the identification code 3 of the third operation request with the processed state.

Step 412: The controller delivers a processing result to the network device.

Afterward, if the distributed node 1 receives a fourth operation request, where the fourth operation request includes a third service object, and it is determined that the fourth operation request is also dependent upon the first operation request, the identification code of the first operation request is used as a dependent code of the fourth operation request. In this case, after the controller receives the fourth operation request, the controller may directly process the fourth operation request according to a status of the dependent code of the fourth operation request because the identification code of the first operation request is in the processed state.

For example, an administrator delivers, to the distributed node 1 using the cloud platform interface, an operation request for creating a router R1. The distributed node 1 allocates an identification code to the operation request, and forwards the operation request and the identification code of the operation request to the controller using the distributed node 2. Then, the administrator also delivers, to the distributed node 1 using the cloud platform interface, an operation request for creating an interface A on the router R1. The distributed node 1 learns, according to service logic, that this operation request is dependent upon the previous operation request for creating the router R1. After allocating an identification code to this operation request, the distributed node 1 forwards this operation request, the identification code, and the identification code of the operation request upon which this operation request is dependent and that is for creating the router R1 to the controller using the distributed node 3. If the operation request for creating the interface A arrives at the controller before the operation request for creating the router R1, the controller marks the identification code of the operation request for creating the interface A on the router R1 with the to-be-processed state, and stores the operation request (if the operation request is directly processed, the processing fails because the router R1 cannot be found). The controller starts processing the operation request for creating the interface A on the router R1 only after the controller receives the operation request for creating the router R1 and the identification code of the operation request and successfully processes the operation request for creating the router R1. Afterward, if the controller receives, using the distributed node 3, an operation request for creating an interface B on the router R1, the controller may directly process the operation request (because the operation request for creating the router R1 has been processed successfully).

In this embodiment, an operation request may be further dependent upon multiple previously sent operation requests. In a specific implementation, if an operation request is dependent upon multiple previously sent operation requests, it is only necessary to send the operation request, an identification code of the operation request, and multiple dependent codes to the controller. In this case, the controller processes the operation request only when identification codes of the multiple operation requests upon which the operation request is dependent are all in the processed state.

Figure 5:
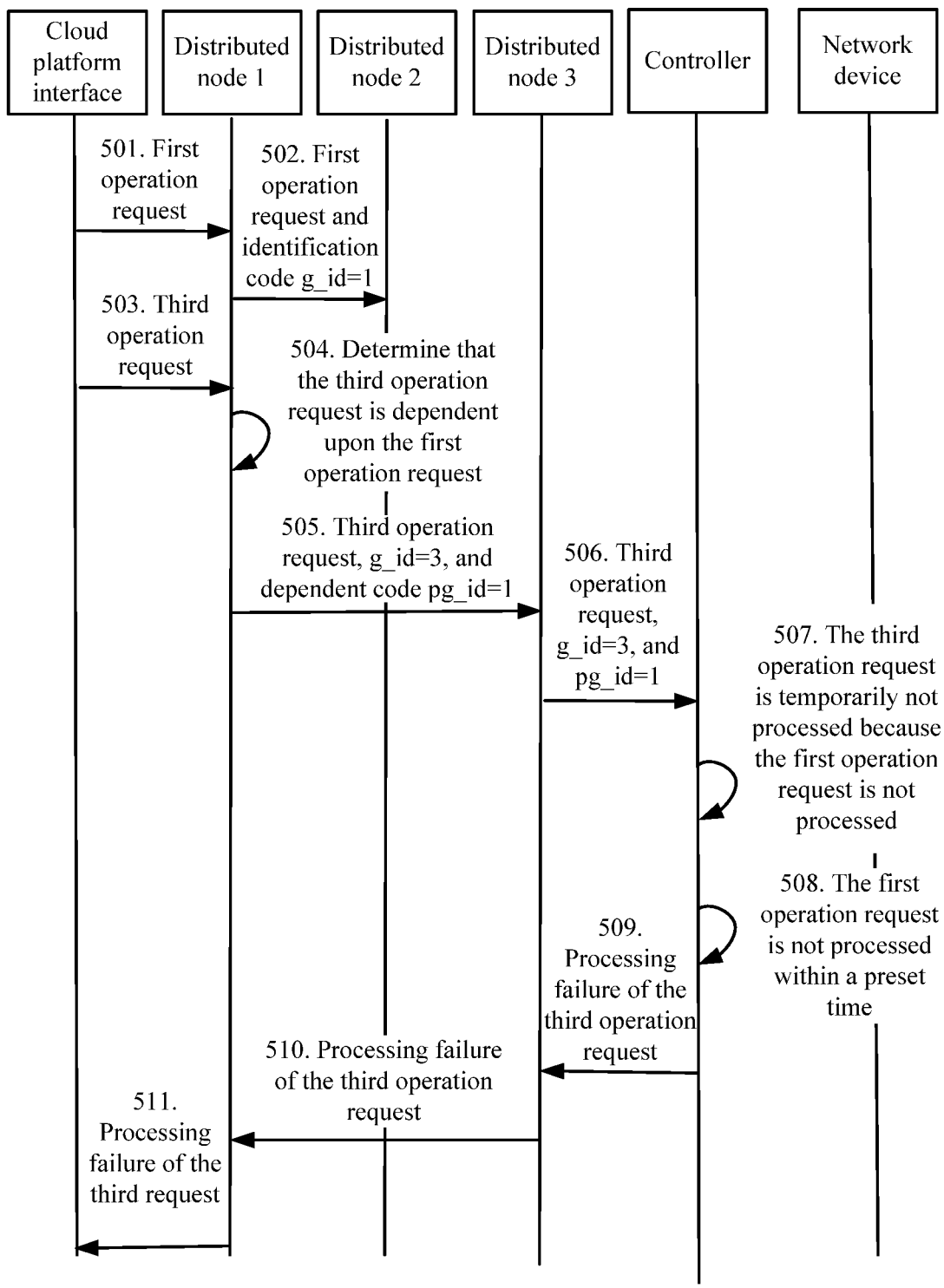
FIG. 5 is a schematic interaction diagram of still another service processing method according to an embodiment of the present disclosure.

In addition, in this embodiment, because the third operation request is dependent upon the first operation request, if the first operation request is not processed, the third operation request is always in the to-be-processed state. When the first operation request upon which the third operation request is dependent is lost, the third operation request cannot be processed for a long time, and processing efficiency is affected. The present disclosure provides the following solution to this problem. Referring to FIG. 5, FIG. 5 is a schematic interaction diagram of still another service processing method according to an embodiment of the present disclosure. The method includes the following steps.

Step 501: A cloud platform interface sends a first operation request to a first distributed node (distributed node 1), where the first operation request includes a first service object.

Step 502: The first distributed node allocates a first identification code g_id=1 to the first operation request, and sends g_id=1 and the first operation request to a distributed node 2.

Step 503: The cloud platform interface sends a third operation request to the distributed node 1, where the third operation request includes a second service object.

Step 504: The distributed node 1 determines that the third operation request is dependent upon the first operation request, and sets the first identification code as a dependent code of the third operation request.

Step 505: The distributed node 1 allocates a third identification code g_id=3 to the third operation request, and sends the third operation request, g_id=3, and the dependent code pg_id=1 to a distributed node 3.

Step 506: The distributed node 3 forwards the third operation request, g_id=3, and pg_id=1 to a controller.

Step 507: The controller determines that the first operation request upon which the third operation request is dependent is not processed, and temporarily does not process the third operation request.

For detailed descriptions of step 501 to step 507, refer to the foregoing steps 401 to 407. Details are not described herein again.

Step 508: The controller learns that the first operation request is not processed within a preset duration.

After receiving the third operation request, g_id=3, and pg_id=1, the controller may record duration of waiting for a status change of the identification code 1 of the first operation request. When the identification code 1 is still in an unprocessed state after the waiting duration exceeds the preset duration, the controller may send a notification message about a processing failure of the third operation request. In this embodiment, if the unprocessed state of the identification code 1 indicates that the operation request 1 (the first operation request) is not processed, if the operation request 1 is successfully processed within the preset duration, a status of the identification code 1 is updated to a processed state. If the unprocessed state of the identification code 1 indicates a processing failure of the operation request 1, a status of the identification code 1 is still the unprocessed state within the preset duration.

Steps 509 and 510: The controller sends a notification message about a processing failure of the third operation request to the distributed node 1 using the distributed node 3.

The notification message about the processing failure of the third operation request may include the identification code g_id=3, the dependent code pg_id=1, and a processing failure reason of the third operation request. The processing failure reason is that the first operation request upon which the third operation request is dependent is unsuccessfully processed within the preset duration.

Step 511: The distributed node 1 sends the notification message about the processing failure of the third operation request to the cloud platform interface for user troubleshooting.

In this embodiment, the first distributed node allocates an identification code to each operation request. When a subsequently sent operation request is dependent upon a previous sent operation request, the first distributed node sends a dependent code when sending the subsequently sent operation request and an identification code to the controller using the second distributed node (distributed nod 2) such that the controller determines, according to a status of the dependent code, whether to process the subsequently sent operation request. The subsequently sent operation request is processed only when the previous sent operation request is successfully processed, otherwise, the subsequently sent operation request is not processed temporarily. Therefore, sequential processing of the sequential operation requests can be ensured, and a processing failure that occurs because the subsequently sent operation request is processed before the previous sent operation request is processed is avoided. In addition, a processing status of an operation request can be reported in a timely manner using a timeout determining mechanism, and this is helpful for timely troubleshooting.

Figure 6:
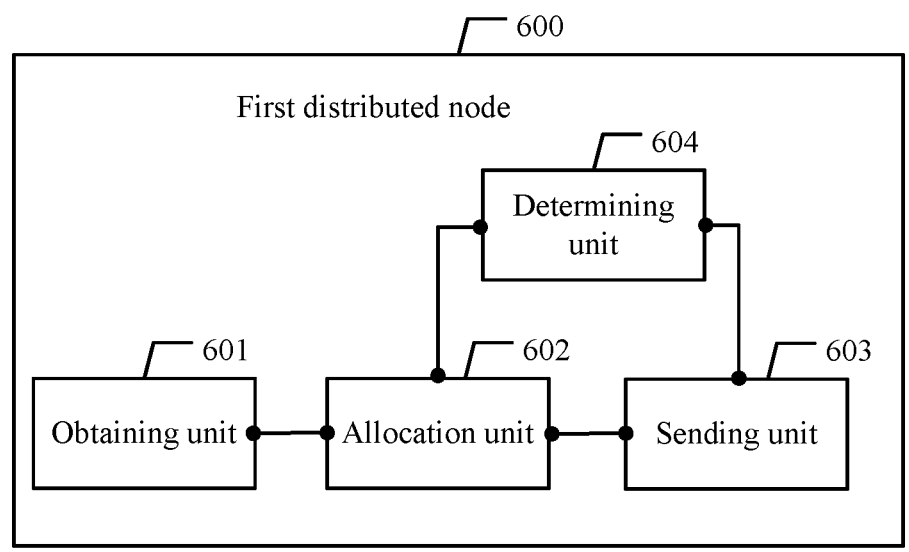
FIG. 6 is a schematic structural diagram of a first distributed node according to an embodiment of the present disclosure.

FIG. 6 is a schematic structural diagram of a first distributed node 600 according to an embodiment of the present disclosure. The first distributed node 600 in the present disclosure communicates with a controller using at least two second distributed nodes. The first distributed node 600 includes an obtaining unit 601 configured to obtain a first operation request, where the first operation request includes a first service object, an allocation unit 602 configured to allocate a first identification code to the first operation request according to a preset rule, where the first identification code is used to identify a processing sequence of the first operation request for the first service object, and a sending unit 603 configured to send the first operation request and the first identification code to the controller using a second distributed node in the at least two second distributed nodes such that the controller determines, according to the preset rule and the first identification code, whether the first operation request needs to be processed.

Further, that the controller determines, according to the preset rule and the first identification code, whether the first operation request needs to be processed includes if it is determined, according to the preset rule and the first identification code, that the first operation request is sent after a second operation request processed by the controller, the controller processes the first operation request, or if it is determined, according to the preset rule and the first identification code, that the first operation request is sent before a second operation request processed by the controller, the controller does not process the first operation request, where the second operation request is sent by the first distributed node to the controller using another second distributed node in the at least two second distributed nodes, and the second operation request includes the first service object.

The obtaining unit 601 is further configured to obtain a third operation request, where the third operation request includes a second service object, the allocation unit 602 is further configured to allocate a third identification code to the third operation request according to the preset rule, where the third identification code is used to identify a processing sequence of the third operation request for the second service object. The first distributed node 600 further includes a determining unit 604 configured to determine that the third operation request is dependent upon the first operation request, and set the first identification code as a dependent code of the third operation request, and the sending unit 603 is further configured to send the third operation request, the third identification code, and the dependent code of the third operation request to the controller using another second distributed node in the at least two second distributed nodes such that the controller processes the third operation request according to the dependent code of the third operation request after processing the first operation request.

In this embodiment, the first distributed node 600 allocates an identification code to an operation request to identify a processing sequence of different operation requests including a same service object for the service object, and correspondingly sends the operation request and the identification code of the operation request to the controller such that the controller determines, according to the preset rule and the identification code of the operation request, whether the operation request needs to be processed. In this way, it is ensured that an operation request that is last sent by the first distributed node 600 and that includes the service object is finally effective. Therefore, a service processing error caused by distributed features of nodes is avoided, and correct service processing is ensured.

Figure 7:
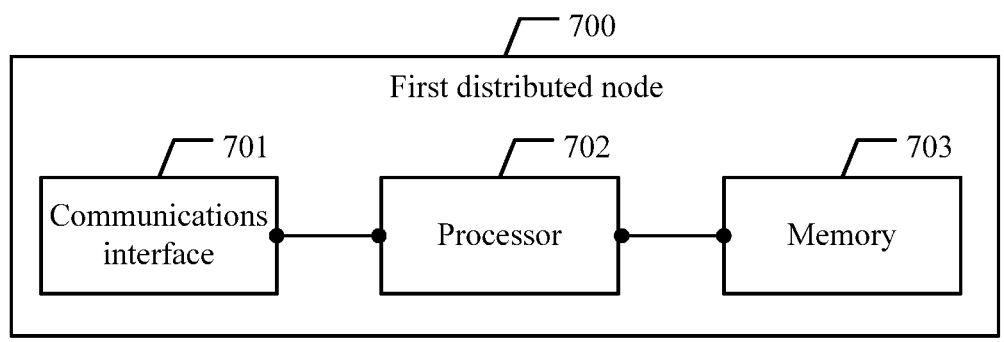
FIG. 7 is a schematic structural diagram of another first distributed node according to an embodiment of the present disclosure.

According to the description of the embodiment shown in FIG. 6, a person skilled in the art may clearly understand that this application may be implemented by software and a universal hardware platform. Referring to FIG. 7, FIG. 7 is a schematic structural diagram of another first distributed node 700 according to an embodiment of the present disclosure. The first distributed node 700 includes at least a communications interface 701, a processor 702, and a memory 703.

The memory 703 stores a group of program instructions. The memory 703 may be a high-speed random access memory (RAM), or may be a non-volatile memory, for example, at least one disk storage.

The processor 702 may be a general-purpose processor, for example, a central processing unit (CPU) or a network processor (NP), or may be an application-specific integrated circuit (ASIC) or one or more integrated circuits configured to implement this embodiment of the present disclosure.

The processor 702 is configured to invoke the program instructions stored in the memory 703 to perform the following operations of obtaining a first operation request, where the first operation request includes a first service object, allocating a first identification code to the first operation request according to a preset rule, where the first identification code is used to identify a processing sequence of the first operation request for the first service object, and sending the first operation request and the first identification code to the controller using a second distributed node in the at least two second distributed nodes such that the controller determines, according to the preset rule and the first identification code, whether the first operation request needs to be processed.

The first distributed node 700 communicates with the at least two second distributed nodes using the communications interface 701.

Further, that the controller determines, according to the preset rule and the first identification code, whether the first operation request needs to be processed includes if it is determined, according to the preset rule and the first identification code, that the first operation request is sent after a second operation request processed by the controller, the controller processes the first operation request, or if it is determined, according to the preset rule and the first identification code, that the first operation request is sent before a second operation request processed by the controller, the controller does not process the first operation request, where the second operation request is sent by the first distributed node to the controller using another second distributed node in the at least two second distributed nodes, and the second operation request includes the first service object.

The processor 702 is further configured to obtain a third operation request, where the third operation request includes a second service object, allocate a third identification code to the third operation request according to the preset rule, where the third identification code is used to identify a processing sequence of the third operation request for the second service object, determine that the third operation request is dependent upon the first operation request, and use the first identification code as a dependent code of the third operation request, and send the third operation request, the third identification code, and the dependent code of the third operation request to the controller using another second distributed node in the at least two second distributed nodes such that the controller processes the third operation request according to the dependent code of the third operation request after processing the first operation request.

Figure 8:
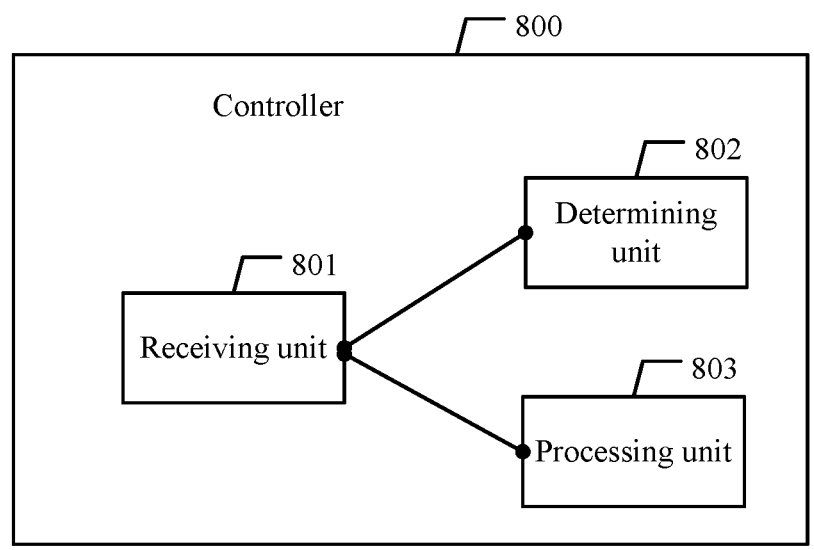
FIG. 8 is a schematic structural diagram of a controller according to an embodiment of the present disclosure.

Referring to FIG. 8, FIG. 8 is a schematic structural diagram of a controller 800 according to an embodiment of the present disclosure. The controller 800 includes a receiving unit 801 configured to receive a first operation request and a first identification code that are sent by a first distributed node using a second distributed node in at least two second distributed nodes, where the first operation request includes a first service object, and the first identification code is used to identify a processing sequence of the first operation request for the first service object, and a determining unit 802 configured to determine, according to a preset rule and the first identification code, whether the first operation request needs to be processed, and if it is determined, according to the preset rule and the first identification code, that the first operation request is sent after a second operation request processed by the controller 800, process the first operation request, or if it is determined, according to the preset rule and the first identification code, that the first operation request is sent before a second operation request processed by the controller 800, skip processing the first operation request, where the second operation request is sent by the first distributed node to the controller 800 using another second distributed node in the at least two second distributed nodes, and the second operation request includes the first service object.

The receiving unit 801 is further configured to receive a third operation request, a third identification code, and a dependent code of the third operation request that are sent by the first distributed node using another second distributed node in the at least two second distributed nodes, where the third operation request includes a second service object, the third identification code is used to identify a processing sequence of the third operation request for the second service object, and the first identification code is the dependent code of the third operation request, and the controller 800 further includes a processing unit 803, and the processing unit 803 is configured to process the third operation request according to the dependent code of the third operation request after processing the first operation request.

In this embodiment, information received by the controller 800 includes an operation request and an identification code of the operation request. The identification code is used to identify a processing sequence of different operation requests including a same service object for the service object. The controller 800 may determine, according to the preset rule and the identification code of the operation request, whether the operation request needs to be processed such that it is ensured that an operation request that is last sent by the first distributed node and that includes the service object is finally effective. Therefore, a service processing error caused by distributed features of nodes is avoided, and correct service processing is ensured.

Figure 9:
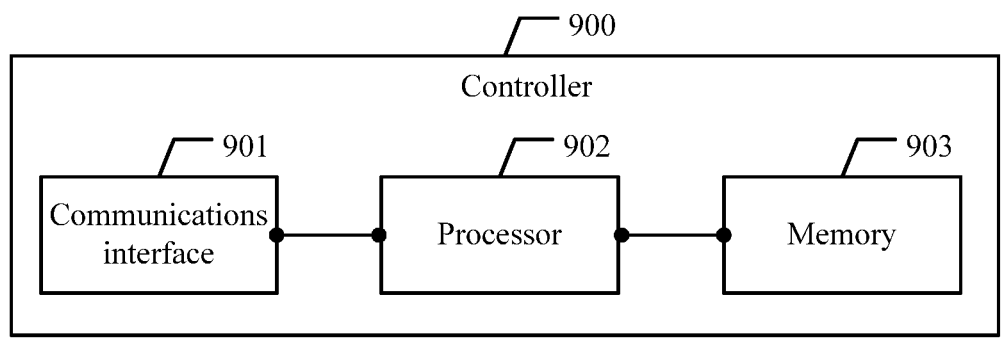
FIG. 9 is a schematic structural diagram of another controller according to an embodiment of the present disclosure.

According to the description of the embodiment shown in FIG. 8, a person skilled in the art may clearly understand that this application may be implemented by software and a necessary universal hardware platform. Referring to FIG. 9, FIG. 9 is a schematic structural diagram of another controller 900 according to an embodiment of the present disclosure. The controller includes at least a communications interface 901, a processor 902, and a memory 903.

The memory 903 stores a group of program instructions. The memory may be a high-speed RAM memory, or may be a non-volatile memory, for example, at least one disk storage.

The processor 902 may be a general-purpose processor, for example, a CPU or an NP, or may be an ASIC or one or more integrated circuits configured to implement this embodiment of the present disclosure.

The processor 902 is configured to invoke the program instructions stored in the memory 903 to perform the following operations of receiving, from the communications interface 901, a first operation request and a first identification code that are sent by a first distributed node using a second distributed node in at least two second distributed nodes, where the first operation request includes a first service object, and the first identification code is used to identify a processing sequence of the first operation request for the first service object, and determining, according to a preset rule and the first identification code, whether the first operation request needs to be processed, and if it is determined, according to the preset rule and the first identification code, that the first operation request is sent after a second operation request processed by the controller 900, processing the first operation request, or if it is determined, according to the preset rule and the first identification code, that the first operation request is sent before a second operation request processed by the controller 900, skip processing the first operation request, where the second operation request is sent by the first distributed node to the controller 900 using another second distributed node in the at least two second distributed nodes, and the second operation request includes the first service object.

The processor 902 is further configured to receive, from the communications interface 901, a third operation request, a third identification code, and a dependent code of the third operation request that are sent by the first distributed node using another second distributed node in the at least two second distributed nodes, where the third operation request includes a second service object, the third identification code is used to identify a processing sequence of the third operation request for the second service object, and the first identification code is the dependent code of the third operation request, and process the third operation request according to the dependent code of the third operation request after processing the first operation request.

For steps or processes that are not described in detail in the foregoing apparatus embodiments, refer to the descriptions of the corresponding method embodiments. Details are not described herein again.

It should be noted that, the apparatus embodiments described above are merely examples. The units described as separate parts may or may not be physically separate. Some or all the modules may be selected according to actual needs to achieve the objectives of the solutions of the embodiments. In addition, in the accompanying drawings of the apparatus embodiments provided in the present disclosure, connection relationships between modules indicate that the modules are communicatively connected to each other, and may be further implemented by one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software and necessary universal hardware, or by dedicated hardware including a dedicated integrated circuit, a dedicated CPU, a dedicated memory, a dedicated component, and the like. Generally, any function that can be performed by a computer program can be easily implemented using corresponding hardware. Moreover, a specific hardware structure used to achieve a same function may be of various forms, for example, an analog circuit, a digital circuit, a dedicated circuit, or the like. However, for the present disclosure, software program implementation is a better implementation in most cases. Based on such an understanding, the technical solutions of the present disclosure essentially or the part contributing to the other approaches may be implemented in a form of a software product. The computer software product is stored in a readable storage medium, such as a floppy disk, a universal serial bus (USB) flash drive, a removable hard disk, a read-only memory (ROM), a RAM, a magnetic disk, or an optical disc of a computer, and includes several instructions for instructing a computer device (which may be a personal computer, a server, a network device, or the like) to execute the methods described in the embodiments of the present disclosure.

The service processing method and the device provided in the embodiments of the present disclosure are described in detail above. Based on the embodiments of the present disclosure, a person of ordinary skill in the art may make modifications and variations to the specific implementation and application scope. Therefore, content of the specification shall not be construed as a limitation to the present disclosure.

What is claimed is:

1. A service processing method, applied to a system comprising a first distributed node and at least two second distributed nodes, wherein the first distributed node communicates with a controller using the at least two second distributed nodes, and wherein the service processing method comprises:

obtaining, by the first distributed node, a first operation request comprising a first service object;

allocating, by the first distributed node, a first identification code to the first operation request according to a preset rule, wherein the first identification code identifies a processing sequence of the first operation request relative to other operation requests obtained separately from the first operation request, and wherein the processing sequence identifies an order to process the other operation requests that include a same service object;

sending, by the first distributed node, the first operation request and the first identification code to the controller using a second distributed node in the at least two second distributed nodes, wherein the preset rule and the first identification code enable the controller to determine whether the first operation request needs to be processed;

obtaining, by the first distributed node, a second operation request comprising a second service object;

allocating, by the first distributed node, a second identification code to the second operation request according to the preset rule, wherein the second identification code identifies a processing sequence of the second operation request for the second service object;

setting, by the first distributed node, the first identification code as a dependent code of the second operation request when the first distributed node determines that the second operation request is dependent upon the first operation request; and sending, by the first distributed node, the second operation request, the second identification code, and the dependent code of the second operation request to the controller using a third distributed node in the at least two second distributed nodes, wherein the dependent code of the second operation request enables the controller to process the second operation request after processing the first operation request.

2. The service processing method of claim 1, wherein identification codes comprise ascending or descending natural numbers.

3. The service processing method of claim 2, wherein the preset rule comprises that corresponding identification codes are allocated according to a sequence of the other operation requests.

4. The service processing method of claim 1, wherein the first identification code comprises a timestamp, and wherein the preset rule comprises a time sequence.

5. The service processing method of claim 1, wherein the preset rule comprises ascending order or descending order.

6. The method of claim 1, wherein the distributed node comprises a first set of processing capabilities, and wherein the at least two second distributed nodes comprises different processing capabilities.

7. A service processing method, applied to a system comprising a first distributed node and at least two second distributed nodes, wherein the first distributed node communicates with a controller using the at least two second distributed nodes, and wherein the service processing method comprises:

processing, by the controller, a second operation request received by the controller from the first distributed node using a third distributed node in the at least two second distributed nodes, wherein the second operation request comprises a first service object and a second identification code;

receiving, by the controller, a first operation request and a first identification code from the first distributed node using a second distributed node in the at least two second distributed nodes, wherein the first operation request comprises the first service object, wherein the first identification code identifies a processing sequence of the first operation request relative to other operation requests obtained separately from the first operation request, and wherein the processing sequence identifies an order to process the other operation requests that include a same service object;

determining, by the controller according to a preset rule, the first identification code, and the second identification code, whether the first operation request needs to be processed;

processing, by the controller, the first operation request when it is determined that the first operation request is sent after the second operation request; and skip processing, by the controller, the first operation request when it is determined that the first operation request is sent before the second operation request.

8. The service processing method of claim 7, further comprising:

receiving, by the controller, a third operation request, a third identification code, and a dependent code of the third operation request from the first distributed node using the other second distributed node in the at least two second distributed nodes, wherein the third operation request comprises a second service object, wherein the third identification code identifies a processing sequence of the third operation request for the second service object, and wherein the first identification code is the dependent code of the third operation request; and processing, by the controller, the third operation request according to the dependent code of the third operation request after processing the first operation request.

9. The service processing method of claim 7, wherein the first identification code comprises a timestamp, and wherein the preset rule comprises a time sequence.

10. The service processing method of claim 7, wherein identification codes comprise ascending or descending natural numbers, and wherein the preset rule comprises ascending order or descending order.

11. The method of claim 7, wherein the distributed node comprises a first set of processing capabilities, and wherein the at least two second distributed nodes comprises different processing capabilities.

12. A first distributed node, comprising:

a processor configured to:
obtain a first operation request comprising a first service object;
allocate a first identification code to the first operation request according to a preset rule, wherein the first identification code identifies a processing sequence of the first operation request relative to other operation requests obtained separately from the first operation request, and wherein the processing sequence identifies an order to process the other operation requests that include a same service object;
obtain a second operation request comprising a second service object;
allocate a second identification code to the second operation request according to the preset rule, wherein the second identification code identifies a processing sequence of the second operation request for the second service object;
determine that the second operation request is dependent upon the first operation request; and
set the first identification code as a dependent code of the second operation request, wherein the dependent code of the second operation request enables the controller to process the second operation request after processing the first operation request; and a transmitter coupled to the processor and configured to:
send the first operation request and the first identification code to a controller using a second distributed node in at least two second distributed nodes, wherein the preset rule and the first identification code enable the controller to determine whether the first operation request needs to be processed; and
send the second operation request, the second identification code, and the dependent code of the second operation request to the controller using a third distributed node in the at least two second distributed nodes.

13. The first distributed node of claim 12, wherein identification codes comprise ascending or descending natural numbers, and wherein the preset rule comprises ascending order or descending order.

14. The first distributed node of claim 12, wherein the preset rule comprises that corresponding identification codes are allocated according to a sequence of different operation requests comprising the same service object.

15. The first distributed node of claim 12, wherein the first distributed node comprises a first set of processing capabilities, and wherein the second distributed node comprises different processing capabilities.

16. A controller, comprising:
a receiver configured to receive a first operation request and a first identification code from a first distributed node using a second distributed node in at least two second distributed nodes, wherein the first operation request comprises a first service object, wherein the first identification code identifies a processing sequence of the first operation request relative to other operation requests obtained separately from the first operation request, and wherein the processing sequence identifies an order to process the other operation requests that include a same service object; and
a processor coupled to the receiver and configured to:
process a second operation request received by the controller from the first distributed node using a third distributed node in the at least two second distributed nodes, wherein the second operation request comprises the first service object and a second identification code;
determine, according to a preset rule, the first identification code, and the second identification code, whether the first operation request needs to be processed;
process the first operation request when it is determined that the first operation request is sent after the second operation request; and
skip processing the first operation request when it is determined that the first operation request is sent before the second operation request.

17. The controller of claim 16, wherein the receiver is further configured to receive a third operation request, a third identification code, and a dependent code of the third operation request from the first distributed node using the other second distributed node in the at least two second distributed nodes, wherein the third operation request comprises a second service object, wherein the third identification code identifies a processing sequence of the third operation request for the second service object, wherein the first identification code comprises the dependent code of the third operation request, and wherein the processor is further configured to process the third operation request according to the dependent code of the third operation request after processing the first operation request.

18. The controller of claim 16, wherein the first identification code comprises a timestamp, and wherein the preset rule comprises a time sequence.

19. The controller of claim 16, wherein the distributed node comprises a first set of processing capabilities, and wherein the at least two second distributed nodes comprises different processing capabilities.

20. The controller of claim 16, wherein identification codes comprise ascending or descending natural numbers, and wherein the preset rule comprises ascending order or descending order.

* * * * *